(No Model.)
W. A. MUNDY.
DEVICE FOR WATERING STOCK.
No. 499,797. Patented June 20, 1893.
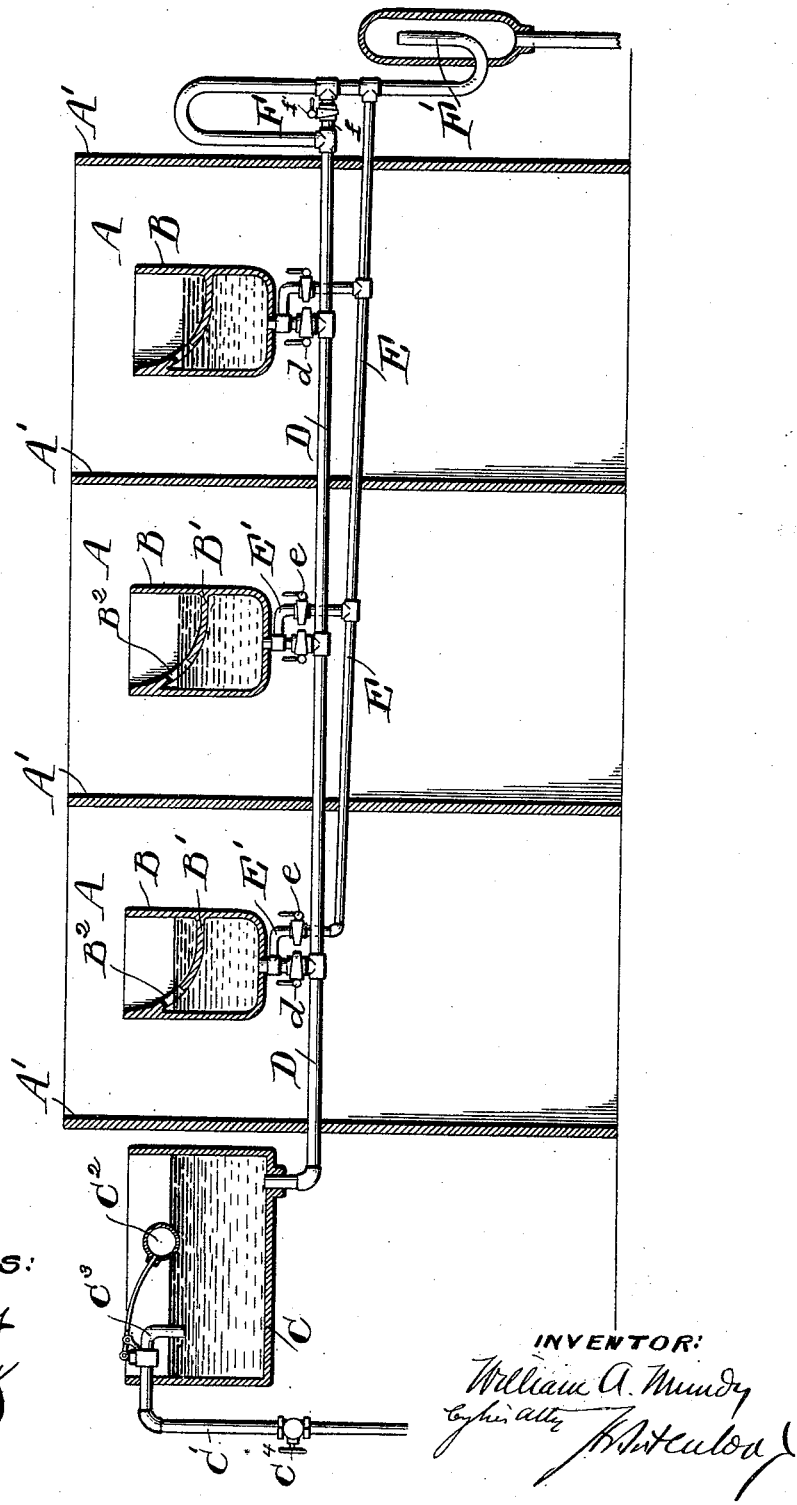

UNITED STATES PATENT OFFICE.

WILLIAM A. MUNDY, OF PHILADELPHIA, PENNSYLVANIA.

DEVICE FOR WATERING STOCK.

SPECIFICATION forming part of Letters Patent No. 499,797, dated June 20, 1893.

Application filed September 8, 1892. Serial No. 445,321. (No model.)

*To all whom it may concern:*

Be it known that I, WILLIAM A. MUNDY, a citizen of the United States, residing in the city of Philadelphia, State of Pennsylvania, have invented certain new and useful Improvements in Horse-Stalls, of which the following is a full, clear, and exact description, reference being had to the accompanying drawings, forming a part of this specification.

My invention relates to horse stalls, and has for its object the construction and arrangement of a water supply system for a stall or series of stalls, whereby the animals may be separately provided with a continuous supply of water, and to that end it consists in the combination, comprising a system, of a water basin or a series of water basins to be erected in a stall or series of contiguous stalls with a water supply tank in one of the stalls and integral with the basin therein, or preferably as a separate structure, outside the series of stalls, and fed by the usual supply pipe, said basins being connected by a feed water supply pipe with separate connecting devices between each basin and said supply pipe and having stop cocks therein, as hereinafter set forth, whereby said feed may, if desired, operate as well for a discharge as for supply. Also in minor features and in the details of the apparatus as will be hereinafter mentioned.

In the accompanying drawings illustrating my invention, which is a vertical sectional view with the pipes shown in elevation, A, A, A, represents a series of three stalls formed by the walls A', A', A', A'. A water supply pipe D passes through these stalls, at a convenient height and location. Mounted upon it, in each stall, by a connecting pipe and stop cock $d$, is a water basin B. This basin may be of any ordinary form or may be of the special form shown, the distinguishing feature of which is the depressed inclined partition B' provided with an opening B² which allows the water to pass to an upper basin formed by the partition B' so that the horse may take water only from said upper basin, and thus avoid splashing or scattering of the water in the stall. Adjacent to or forming a part of one of the basins, or at a convenient point in the stable and outside the series of stalls, is erected a water supply tank C fed by the usual water supply C' controlled by a stop cock C⁴. This tank may be of any convenient form or construction provided it is supplied with apparatus whereby water fed therefrom may be continuously kept at a certain height in the basins; and to this end I prefer to locate the tank in the same horizontal plane with the basins and to control the supply thereto by means of the usual float C² controlling the valve C³ as shown in the drawings. As before remarked, however, the essential feature of the system is the arrangement of the basins in sequence connected directly or indirectly by the water supply pipe and automatically provided with a continuous supply of water in each, and to this end the tank and the first basin in the series may be made integral.

A waste pipe E is provided to discharge the water from each of the basins B, and is separately connected with each of said basins by means of an elbow E' having a stop cock connection $e$ between the basin and the waste pipe. Said supply pipe D and waste pipe E I prefer to connect with a waste siphon-shaped tube F and a trap F' as shown in the drawings, of which any approved form may be used. It must be understood, however, that while the siphon shaped overflow F is necessary to keep the water at a certain height in the basins, the trap F' is not an essential element of my system.

It will be observed from the drawings and from the description which I have given that the waste pipe E is not an essentially necessary element, as other means of discharge may be substituted therefor as by means of the series of separate connecting tubes and stop cocks $d$, the supply pipe D may be used for discharge as well as supply, in which case the overflow pipe F, if used, is rendered ineffective during the discharge, by means of the direct connecting tube $f$ and its valve $f'$.

Instances occur where it is desirable to shut off the supply of water from one of the basins and not from the others, and in such instances where a separate discharge pipe E is not used and discharge is made through the supply pipe D, the stop cock $d$ must be closed to shut off access to the supply pipe D which can thus be readily converted temporarily into a discharge pipe.

Having thus described my invention, what I claim as new, and desire to secure by Letters Patent, is—

1. A water supply system for a series of contiguous stalls, consisting of a main supply pipe, a series of basins connected therewith, each having a separate supply tube, with stop cock devices therein, means to automatically supply a constant flow of water to the basins through said connections, a siphon-shaped overflow at the terminus of said main supply pipe and a direct connecting discharge tube with a valve therein, between the ends of said overflow pipe; said parts being constructed, combined and arranged in such manner that the water will always be kept at a fixed height in each of said basins, and whereby the main pipe may be used for either supply or discharge at pleasure; substantially as described.

2. A water supply system for a series of contiguous stalls provided with an automatically operating supply valve, a series of connected basins, each provided with a separate supply pipe, a main supply pipe between said tank and the separate supply pipe of each of the basins in the series, stop cock devices in each separate supply pipe adapted to shut off the supply to each or all of said basins as desired, and a waste pipe connected with each or all of said basins, with stop cock devices therein adapted to discharge from each or all at pleasure; substantially as described.

3. A water supply system for a series of contiguous stalls, consisting of a supply tank provided with an automatically operating supply valve, a series of connected basins each provided with a separate supply pipe, a main supply pipe between said tank and the separate supply pipe of each basin in the series, with stop cock devices in each separate supply pipe adapted to control the supply to or the discharge from each or any of said basins into the main supply pipe at pleasure, and water trap mechanism into which the waste water is discharged through the main supply pipe from any and all of the basins in the series; substantially as described.

In testimony whereof I have hereunto affixed my signature this 2d day of September, A. D. 1892.

WILLIAM A. MUNDY.

Witnesses:
JAMES S. PHILLIPS,
H. T. FENTON.